United States Patent
Aruga et al.

(10) Patent No.: US 11,960,949 B2
(45) Date of Patent: Apr. 16, 2024

(54) INFORMATION PROCESSING APPARATUS, INFORMATION PROCESSING SYSTEM, AND INFORMATION PROCESSING METHOD

(71) Applicants: Ryoh Aruga, Kanagawa (JP); Hiroshi Kobayashi, Kanagawa (JP)

(72) Inventors: Ryoh Aruga, Kanagawa (JP); Hiroshi Kobayashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/543,742

(22) Filed: Dec. 7, 2021

(65) Prior Publication Data

US 2022/0180138 A1 Jun. 9, 2022

(30) Foreign Application Priority Data

Dec. 9, 2020 (JP) ................................ 2020-204488

(51) Int. Cl.
*G06K 19/06* (2006.01)
*G06F 40/174* (2020.01)
*G06V 30/412* (2022.01)

(52) U.S. Cl.
CPC ..... *G06K 19/06037* (2013.01); *G06F 40/174* (2020.01); *G06V 30/412* (2022.01)

(58) Field of Classification Search
CPC ............ G06K 19/06037; G06F 40/174; G06V 30/412
See application file for complete search history.

(56) References Cited

U.S. PATENT DOCUMENTS

| | | | | |
|---|---|---|---|---|
| 7,685,522 B1 * | 3/2010 | Feuerman | ............. | G06F 40/174 715/728 |
| 8,418,920 B2 * | 4/2013 | Lieberman | ............. | G06Q 10/10 235/383 |
| 9,286,283 B1 * | 3/2016 | Wilczek | ............... | G06V 30/412 |
| 9,659,284 B1 * | 5/2017 | Wilson | ............... | G06Q 20/322 |
| 9,760,871 B1 * | 9/2017 | Pourfallah | ............. | G06Q 10/10 |
| 11,087,310 B2 * | 8/2021 | Jain | ...................... | G06Q 20/405 |
| 11,195,215 B1 * | 12/2021 | Silver | .................... | G06Q 20/10 |
| 2002/0091540 A1 * | 7/2002 | Stumne | .................. | G06Q 30/04 705/34 |
| 2002/0107885 A1 * | 8/2002 | Brooks | ................. | G06F 40/174 715/224 |
| 2002/0194208 A1 * | 12/2002 | Knoll | ..................... | G06K 17/00 |

(Continued)

FOREIGN PATENT DOCUMENTS

| | | | | |
|---|---|---|---|---|
| BE | 1021619 B1 * | 12/2015 | ............. | A45D 34/02 |
| CA | 2414511 C  * | 8/2009 | ............... | B07C 3/00 |

(Continued)

*Primary Examiner* — Shahid K Khan
(74) *Attorney, Agent, or Firm* — XSENSUS LLP

(57) ABSTRACT

An information processing apparatus includes circuitry that displays, on a display, form management information including form information indicating content of a form and management information for managing the form information, the form information having been acquired based on an embedment code included in form image data of the form, and in response to an instruction to output the form management information, outputs the form management information to an extraneous source.

9 Claims, 14 Drawing Sheets

(56) References Cited

U.S. PATENT DOCUMENTS

| | | | | |
|---|---|---|---|---|
| 2003/0004874 A1* | 1/2003 | Ludwig | | G06Q 30/04 705/40 |
| 2003/0204421 A1* | 10/2003 | Houle | | G06Q 10/10 707/999.107 |
| 2003/0212617 A1* | 11/2003 | Stone | | G06Q 40/00 705/30 |
| 2004/0181482 A1* | 9/2004 | Yap | | G06Q 30/04 705/40 |
| 2005/0125294 A1* | 6/2005 | Dupre | | G06Q 50/06 705/16 |
| 2005/0246661 A1* | 11/2005 | Klein | | G06F 16/00 715/780 |
| 2006/0082557 A1* | 4/2006 | Ericson | | G06K 7/1491 345/179 |
| 2006/0113387 A1* | 6/2006 | Baker | | B07C 3/14 235/462.12 |
| 2007/0154098 A1* | 7/2007 | Geva | | G06F 40/174 715/224 |
| 2008/0091944 A1* | 4/2008 | von Mueller | | G06Q 20/12 713/168 |
| 2008/0147561 A1* | 6/2008 | Euchner | | G06Q 20/3829 705/64 |
| 2010/0296753 A1* | 11/2010 | Ito | | G06K 17/0022 235/462.25 |
| 2011/0090534 A1* | 4/2011 | Terao | | H04N 1/32561 358/1.15 |
| 2011/0235915 A1* | 9/2011 | Yamaguchi | | G06F 3/04883 382/186 |
| 2012/0211561 A1* | 8/2012 | Lieberman | | G06Q 90/00 235/494 |
| 2012/0325902 A1* | 12/2012 | Goyal | | G06K 19/08 235/494 |
| 2012/0330769 A1* | 12/2012 | Arceo | | G06Q 20/4014 455/411 |
| 2013/0024320 A1* | 1/2013 | Banino | | G06Q 30/06 235/383 |
| 2013/0317835 A1* | 11/2013 | Mathew | | G06Q 10/10 705/40 |
| 2014/0019352 A1* | 1/2014 | Shrivastava | | G06Q 20/326 705/41 |
| 2014/0067619 A1* | 3/2014 | Heimbach | | B42D 1/00 705/26.81 |
| 2014/0195359 A1* | 7/2014 | Schulz | | G06Q 30/04 705/16 |
| 2014/0231502 A1* | 8/2014 | Marsico | | G06Q 30/0203 235/375 |
| 2014/0258826 A1* | 9/2014 | Barrus | | G06Q 10/0633 715/224 |
| 2014/0289107 A1* | 9/2014 | Moshal | | G06K 19/06037 705/40 |
| 2014/0298151 A1* | 10/2014 | Fitzpatrick | | G06F 40/186 715/226 |
| 2014/0359294 A1* | 12/2014 | Armitage | | G06K 19/06037 235/494 |
| 2015/0088740 A1* | 3/2015 | Doyle | | G06Q 40/00 705/42 |
| 2015/0205777 A1* | 7/2015 | Campanelli | | G06V 30/418 715/226 |
| 2015/0248392 A1* | 9/2015 | Watanabe | | G06F 16/955 715/226 |
| 2016/0155112 A1* | 6/2016 | Phillips | | G06Q 20/3276 235/379 |
| 2016/0203363 A1* | 7/2016 | Kashima | | G06V 30/40 382/218 |
| 2016/0358174 A1* | 12/2016 | Kassemi | | G06Q 20/3823 |
| 2017/0287050 A1* | 10/2017 | Kagiwada | | G06Q 30/0603 |
| 2017/0351913 A1* | 12/2017 | Chen | | G06V 30/412 |
| 2018/0349871 A1* | 12/2018 | Moshal | | G06Q 20/102 |
| 2019/0372769 A1* | 12/2019 | Fisher | | G06K 7/1417 |
| 2020/0026752 A1* | 1/2020 | Ishikura | | G06F 3/0482 |
| 2020/0026950 A1* | 1/2020 | Kobayashi | | G06V 30/412 |
| 2020/0092272 A1* | 3/2020 | Eisen | | H04L 63/0869 |
| 2021/0124973 A1* | 4/2021 | Aruga | | G06V 30/412 |
| 2021/0184853 A1* | 6/2021 | Crowson | | H04L 67/53 |
| 2021/0342780 A1* | 11/2021 | Schannuth | | G07G 1/0045 |
| 2022/0044012 A1* | 2/2022 | Kobayashi | | G06V 10/225 |

FOREIGN PATENT DOCUMENTS

| | | | | |
|---|---|---|---|---|
| EP | 2149855 A1 * | 2/2010 | | G06F 19/321 |
| EP | 3046063 A1 * | 7/2016 | | |
| FR | 3111456 A1 * | 12/2021 | | G06Q 20/02 |
| JP | 2004094519 A * | 3/2004 | | |
| JP | 2004258763 A * | 9/2004 | | |
| JP | 2006268446 A * | 10/2006 | | |
| JP | 2006281701 A * | 10/2006 | | |
| JP | 2009098938 A * | 5/2009 | | |
| JP | 2011233030 A * | 11/2011 | | |
| JP | 2011248391 A * | 12/2011 | | |
| JP | 2013056505 A * | 3/2013 | | |
| JP | 2016-051339 | 4/2016 | | |
| JP | 2021-060801 | 4/2021 | | |
| JP | 2021-071758 | 5/2021 | | |
| KR | 20140089597 A * | 7/2014 | | |
| KR | 20210028457 A * | 3/2021 | | |
| WO | WO-2005096750 A2 * | 10/2005 | | A63F 13/25 |
| WO | WO-2005106709 A1 * | 11/2005 | | G06F 17/30 |
| WO | WO-2013068767 A1 * | 5/2013 | | G06F 16/9554 |
| WO | WO-2019134543 A1 * | 7/2019 | | G06Q 30/04 |

\* cited by examiner

FIG. 4

TENANT ID = User01 (XX CORPORATION)   210

| NAME | ADDRESS | TELEPHONE NUMBER | EMAIL ADDRESS | NAME OF PERSON IN CHARGE | ... |
|---|---|---|---|---|---|
| YY CORPORATION | TOKYO, ... | 03-OOOO-OOOO | OO@OO.OO | XYZ TARO | ... |

FIG. 5

TENANT ID = User01 (XX CORPORATION)   220

| FORM ID | BILLING DESTINATION | BILLING AMOUNT | BILLING DATE | PAYMENT DUE DATE | ... | DESCRIPTION INFORMATION 1 | | | | ... | TRANSFER DESTINATION INFORMATION 1 | | | | ... |
|---|---|---|---|---|---|---|---|---|---|---|---|---|---|---|---|
| | | | | | | PRODUCT CODE | PRODUCT NAME | QUANTITY | UNIT PRICE | PRICE | | BANK NAME | BRANCH NAME | ACCOUNT TYPE | ACCOUNT NUMBER |
| 0105 | YY CORPORATION | 1,790,208 | 2018/07/20 | 2018/08/20 | ... | 10845 | DRAWING-ROOM TABLE | 2 | 59,800 | 119,600 | ... | ZZ BANK | ABC | CHECKING ACCOUNT | 1111111 |

FIG. 6

| EMBEDMENT POSITION (UPPER LEFT) | EMBEDMENT POSITION (LOWER RIGHT) | EMBEDMENT TYPE | EMBEDMENT CONTENT | ENCRYPTION KEY |
|---|---|---|---|---|
| (2400,3430) | (2425,3455) | QR CODE | FORM ID | ●●●●●●●●●● |
| ... | | | | |

TENANT: User11 (Y CORPORATION)

| FORM ID | BILLING SOURCE | BILLING AMOUNT | BILLING DATE | PAYMENT DUE DATE | DESCRIPTION INFORMATION 1 | | ... | JOURNAL INFORMATION | | ... |
|---|---|---|---|---|---|---|---|---|---|---|
| | | | | | PRODUCT CODE | PRODUCT NAME | | PRODUCT CODE | PRODUCT NAME | |
| 0105 | XX CORPO- RATION | 1,790,208 | 2018/07/20 | 2018/08/20 | 10845 | DRAWING- ROOM TABLE | ... | ZZ BANK | ABC | C) XX |

<Form Confirmation and Correction> — 132 — 131 — 136 User01 (YY Corporation) — 133

Draft Stored — 140 Rate of Accuracy: 100%

Invoice Information:
- Invoice No.: A123-03 — Billing Date: July 20, 2018
- Billing Source: XX Corporation
- Billing Amount (Tax-inclusive): 1,790,208 — Billing Amount (Tax-exclusive): 1,657,600
- Description Information: Drawing-room Table — Total Price: 1,657,600
  - 10845 — 119,400
  - Office Desk — 2 — 59,800
  - — 207,200

— 134

Edit — 137 — 2018/08/20

Journal Form

| | Debit Total Amount 1,790,208 | Credit Total Amount 1,790,208 |
|---|---|---|
| | 2020 Building Attached Facilities | Tax-inclusive Automatic Calculation 132,608 | 3230 Accrued Charge | Without Tax Calculation 0 | 1,790,208 |
| Auxiliary Code | 0001: Tokyo Section | Auxiliary Code | 0001: Tokyo Section |
| | XX Corporation, for July, furniture fee, Tokyo section | |

+ Additionally Journalize — 138

Store Draft     Determine — 139

— 135

---

Page ◀ 1/1 ▶     Zoom ⊕ ⊖ ▫

INVOICE

To: YY Corporation
Billing Date: July 20, 2018
XX Corporation

We kindly request the following payment.
Payment Method: Please transfer to the following account.
Payment Due Date: August 20, 2018

Customer No. AI-4567-89
Invoice No. A123-03
Billing Cycle For June, 2018

Total Billing Amount ¥1,790,208
Consumption Tax ¥132,608

ZZ Bank  Branch: ABC  Type: Checking Account
Account No.: 1111111  Account Name: C) XX  — 126

| Product Code | Product Name | Quantity | Unit Price | Price |
|---|---|---|---|---|
| 10845 | Drawing-room Table | 2 | ¥59,800 | ¥119,600 |
| 22563 | Office Desk | 14 | ¥14,800 | ¥207,200 |
| 00562 | Chair | 14 | ¥36,800 | ¥515,200 |
| 41523 | Cabinet | 10 | ¥59,800 | ¥598,000 |
| 20783 | Shredder | 2 | ¥19,800 | ¥39,600 |
| 30856 | Refrigerator | 2 | ¥89,000 | ¥178,000 |
| | | | Subtotal | ¥1,657,600 |

— 127 (QR code)

...

Sample Data

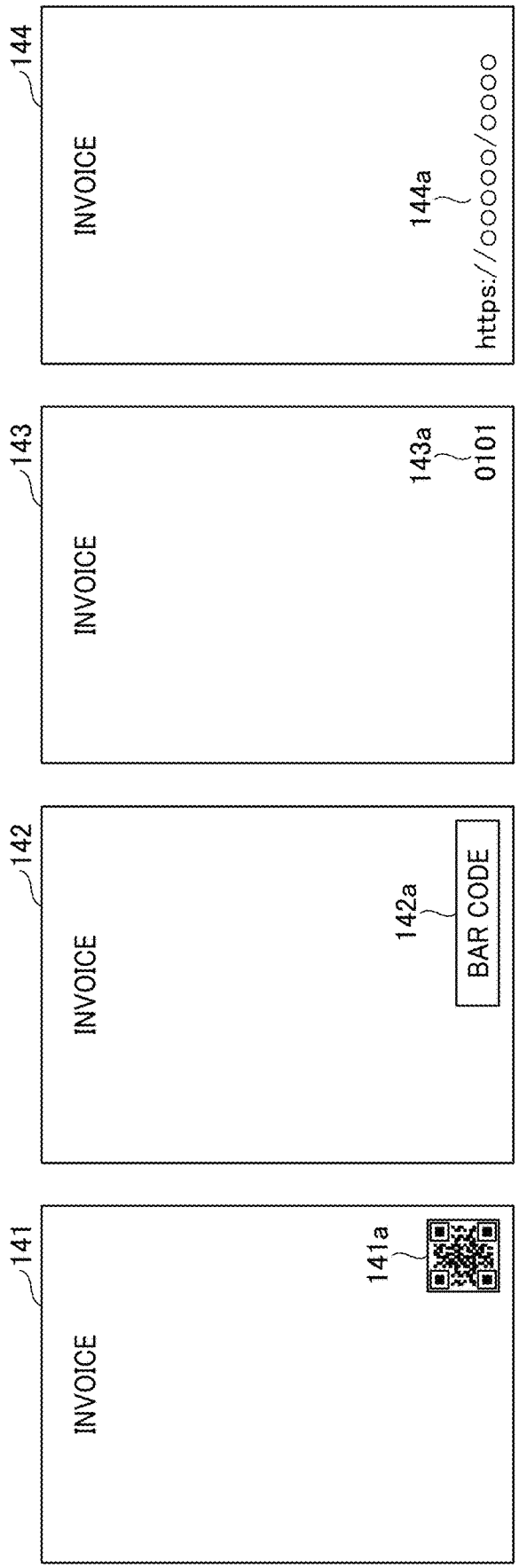

INFORMATION PROCESSING APPARATUS, INFORMATION PROCESSING SYSTEM, AND INFORMATION PROCESSING METHOD

CROSS-REFERENCE TO RELATED APPLICATIONS

This patent application is based on and claims priority pursuant to 35 U.S.C. § 119(a) to Japanese Patent Application No. 2020-204488, filed on Dec. 9, 2020, in the Japan Patent Office, the entire disclosure of which is hereby incorporated by reference herein.

BACKGROUND

Technical Field

The present disclosure relates to an information processing apparatus, an information processing system, and an information processing method.

Description of the Related Art

There is a technique of displaying an input screen of a form and creating form image data, for example, in a portable document format (PDF), based on information on an input form. There is also a technique of performing character recognition using, for example, optical character reader (OCR) on a form image of the form image data to extract a character string included in the form image and request a user to confirm an extraction result.

With the character recognition of such technique, a character string may not be correctly extracted.

SUMMARY

Example embodiments include an information processing apparatus including circuitry that displays, on a display, form management information including form information indicating content of a form and management information for managing the form information, the form information having been acquired based on an embedment code included in form image data of the form, and in response to an instruction to output the form management information, outputs the form management information to an extraneous source.

Example embodiments include an information processing system including a server, a first terminal device, and a second terminal. The first terminal device includes a display that displays an input screen of form information, and circuitry that transmits the form information input on the input screen to the server. The server includes circuitry that receives the form information, and stores, in a memory, information for identifying an input source of the form information and the form information input by the input source in association. In response to an input of form image data from the second terminal device, the server transmits to the second terminal device form management information including form information and management information for managing the form information, the form management information having been acquired from the memory based on an embedment code included in the form image data input from the second terminal device, and in response to an instruction to output the form management information, outputs the form management information to an extraneous source. The second terminal device includes a display that displays the form management information received from the server.

Example embodiments include an information processing method including: displaying, on a display, form management information including form information indicating content of a form and management information for managing the form information, the form information having been acquired based on an embedment code included in form image data of the form; and in response to an instruction to output the form management information, outputting the form management information to an extraneous source.

Example embodiments include a non-transitory recording medium which, when executed by one or more processors, cause the processors to perform an information processing method including: displaying, on a display, form management information including form information indicating content of a form and management information for managing the form information, the form information having been acquired based on an embedment code included in form image data of the form; and in response to an instruction to output the form management information, outputting the form management information to an extraneous source.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 4 is an example table of a customer management database;

FIG. 5 is an example table of an invoice database;

FIG. 6 is an example table of an embedment management database;

FIG. 7 is an example table of an invoice management database:

FIG. 13 illustrates an example of a confirmation screen:

FIGS. 14A to 14D illustrate examples of invoices;

Figure 1:
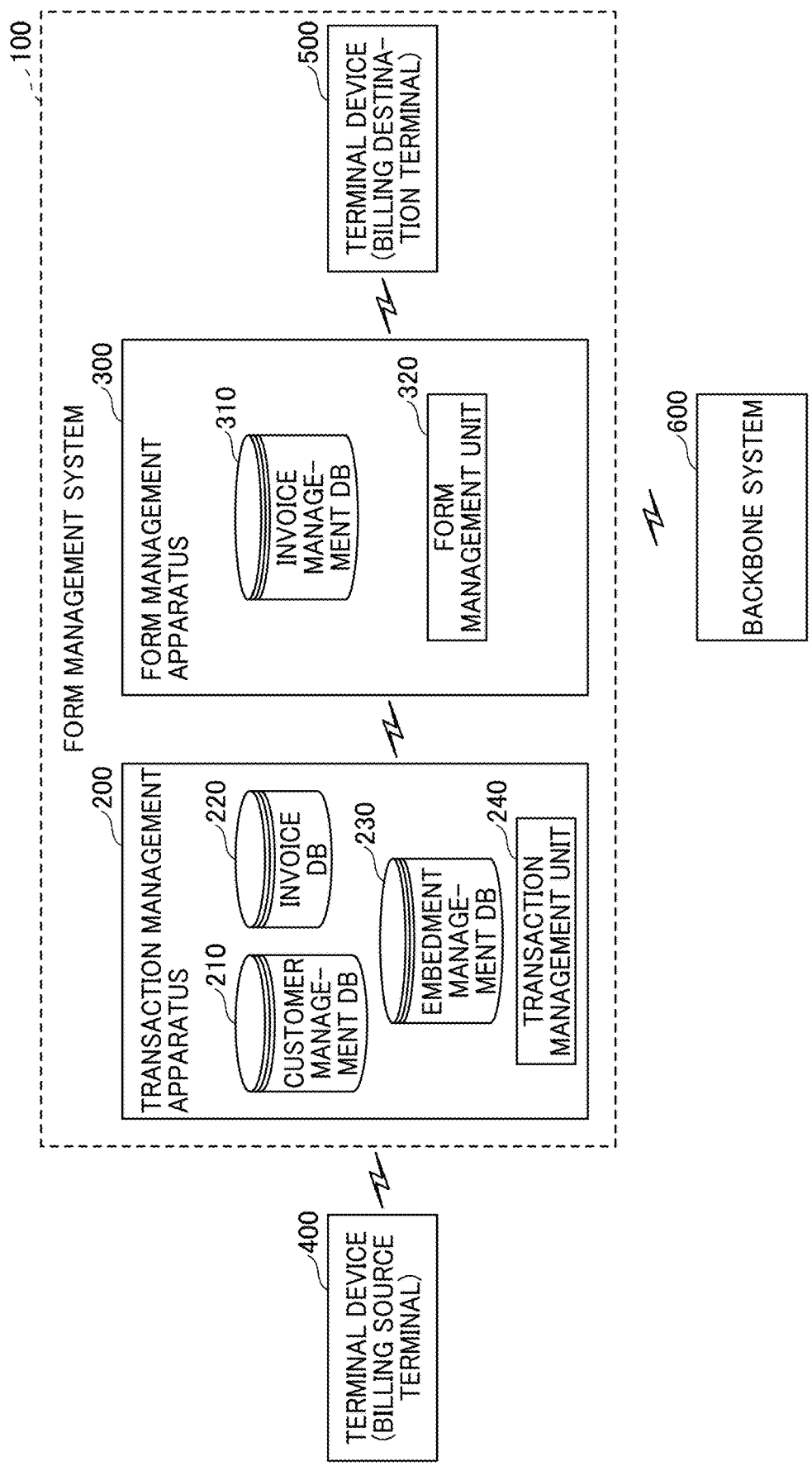
FIG. 1 illustrates an example of a system configuration of a form management system according to a first embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. Referring now to the drawings, embodiments of the present disclosure are described below. As used herein, the singular forms "a," "an," and "the" are intended to include the plural forms as well, unless the context clearly indicates otherwise.

Hereinafter, a first embodiment will be described referring to the drawings. FIG. 1 illustrates an example of a system configuration of a form management system 100 according to the first embodiment.

The form management system 100 of the present embodiment includes a transaction management apparatus 200, a form management apparatus 300, and a terminal device 500. The transaction management apparatus 200 and the form management apparatus 300 are both information processing apparatuses and communicable via a network. The terminal device 500 may be, for example, a tablet terminal, and may be communicable with both the transaction management apparatus 200 and the form management apparatus 300.

In the form management system 100 of the present embodiment, when form information indicative of the content of a form is input from a terminal device 400, the transaction management apparatus 200 generates and outputs form image data including the form information. The terminal device 400 is mainly used by an issuer of a form.

At this time, the transaction management apparatus 200 generates an embedment code indicative of form identification information for identifying the form, and adds the embedment code to the form image data. Thus, in the present embodiment, when the form image data generated by the transaction management apparatus 200 is output as a form, the form has the embedment code indicative of the form identification information for identifying the form. The transaction management apparatus 200 stores, in a memory, the form identification information and the form information in association with each other.

In the form management system 100, when form image data is input from the terminal device 500, the form management apparatus 300 reads form identification information from an embedment code included in the form image data. The terminal device 500 is mainly used by a recipient of a form.

Then, the form management apparatus 300 acquires form information stored in association with the read form identification information from the transaction management apparatus 200. The form management apparatus 300 outputs form management information in which the acquired form information is associated with management information for managing the form information, to a backbone system 600. The backbone system 600 executes various processes using form management information.

As described above, when a form is issued, the form management system 100 according to the present embodiment generates an embedment code including form identification information for identifying the form and embeds the embedment code in form image data. When form image data is input from a recipient of a form, the form management system 100 of the present embodiment acquires form information corresponding to an embedment code included in the form image data.

Thus, according to the present embodiment, the form information input when the form is issued can be acquired without performing the character recognition process on the form image data input from the recipient of the form. That is, according to the present embodiment, it is possible to improve the accuracy of the information acquired from the form image.

In the present embodiment, as the information included in the form image, the form information input when the form is issued is provided to the backbone system 600 that is an external system (an example of extraneous resource) to the form management system 100. Thus, according to the present embodiment, highly accurate information can be provided to the backbone system 600.

In the following description, an invoice is described as an example of a form. Thus, in the following description, an issuer of a form is an issuer of an invoice, and a recipient of a form is a billing destination to which an invoice is sent.

The issuer of the invoice is, for example, a business operator who makes transactions with various customers. The business operator of the present embodiment may be an individual, or an organization, such as a company or a corporation. In the following description of the embodiment, the business operator may be expressed as a tenant A.

The billing destination of the invoice is a customer of the issuer of the invoice. In other words, the billing destination of the invoice is a customer of the tenant A. In the following description of the embodiment, the billing destination of an invoice may be expressed as a tenant B.

In the form management system 100 of the present embodiment, the transaction management apparatus 200 includes a customer management database 210, an invoice database 220, an embedment management database 230, and a transaction management unit 240. The transaction management apparatus 200 communicates with the terminal device 400.

The terminal device 400 is mainly used by an issuer of an invoice (tenant A). In the following description, the terminal device 400 may be referred to as a billing source terminal 400.

The customer management database 210 stores customer information related to a customer of the tenant A. The invoice database 220 stores invoice information related to an invoice input by the tenant A. The embedment management database 230 stores embedment management information in which an embedment code generated when an invoice is issued is associated with invoice information.

The transaction management unit 240 of the present embodiment receives an input of invoice information from the terminal device 400, and generates and outputs form image data including an invoice (form) and an embedment code indicative of form identification information for identifying the invoice. The transaction management unit 240 is implemented by, for example, a processor such as a CPU of FIG. 2.

The form management apparatus 300 of the present embodiment includes an invoice management database 310 and a form management unit 320. The form management apparatus 300 communicates with the transaction management apparatus 200, the terminal device 500, and the backbone system 600. The form management unit 320 is implemented by, for example, a processor such as the CPU of FIG. 2.

The terminal device 500 is mainly used by a billing destination of an invoice. In the following description, the terminal device 500 may be referred to as a billing destination terminal 500.

The backbone system 600 performs a specific process using, for example, invoice management information stored in the invoice management database 310. Specifically, the backbone system 600 may be, for example, an accounting system that transfers a billing amount to a financial institution.

The invoice management database 310 of the present embodiment stores form management information in which invoice information acquired from form image data input from the terminal device 500 is associated with management information for managing an invoice. The invoice information of the present embodiment is information indicative of the content of an invoice, and is an example of form information indicative of the content of a form.

When form image data is input from the terminal device 500, the form management unit 320 acquires invoice information corresponding to an embedment code included in the form image data from the transaction management apparatus 200. When invoice information is not acquired from the transaction management apparatus 200, the form management unit 320 performs form recognition on a form image indicated by the form image data, and acquires invoice information as a recognition result. The form management unit 320 further associates the invoice information with management information input from the terminal device 500 to generate invoice management information, and stores the invoice management information in the invoice management database 310. In response to a request from the terminal device 500, the form management unit 320 outputs the invoice management information to the backbone system 600.

While the form management system 100 illustrated in FIG. 1 includes the transaction management apparatus 200, the form management apparatus 300, and the billing destination terminal 500, the apparatuses and devices included in the form management system 100 are not limited thereto. The form management system 100 may include the terminal device 400. The form management system 100 may include the transaction management apparatus 200 and the form management apparatus 300, and may not include the terminal devices 400 and 500.

In the present embodiment, the transaction management apparatus 20 and the form management apparatus 300 are separate apparatuses; however, the transaction management apparatus 200 and the form management apparatus 300 do not have to be separate apparatuses. The transaction management apparatus 200 and the form management apparatus 300 may be implemented by one information processing apparatus or three or more information processing apparatuses.

Hardware configurations of the transaction management apparatus 200 and the form management apparatus 300 according to the present embodiment are described below referring to FIG. 2. Since the transaction management apparatus 200 and the form management apparatus 300 of the present embodiment are general-purpose information processing apparatuses (such as computers), the hardware configuration of the form management apparatus 300 is described as an example of the hardware configuration of the information processing apparatus in FIG. 2.

Figure 2:
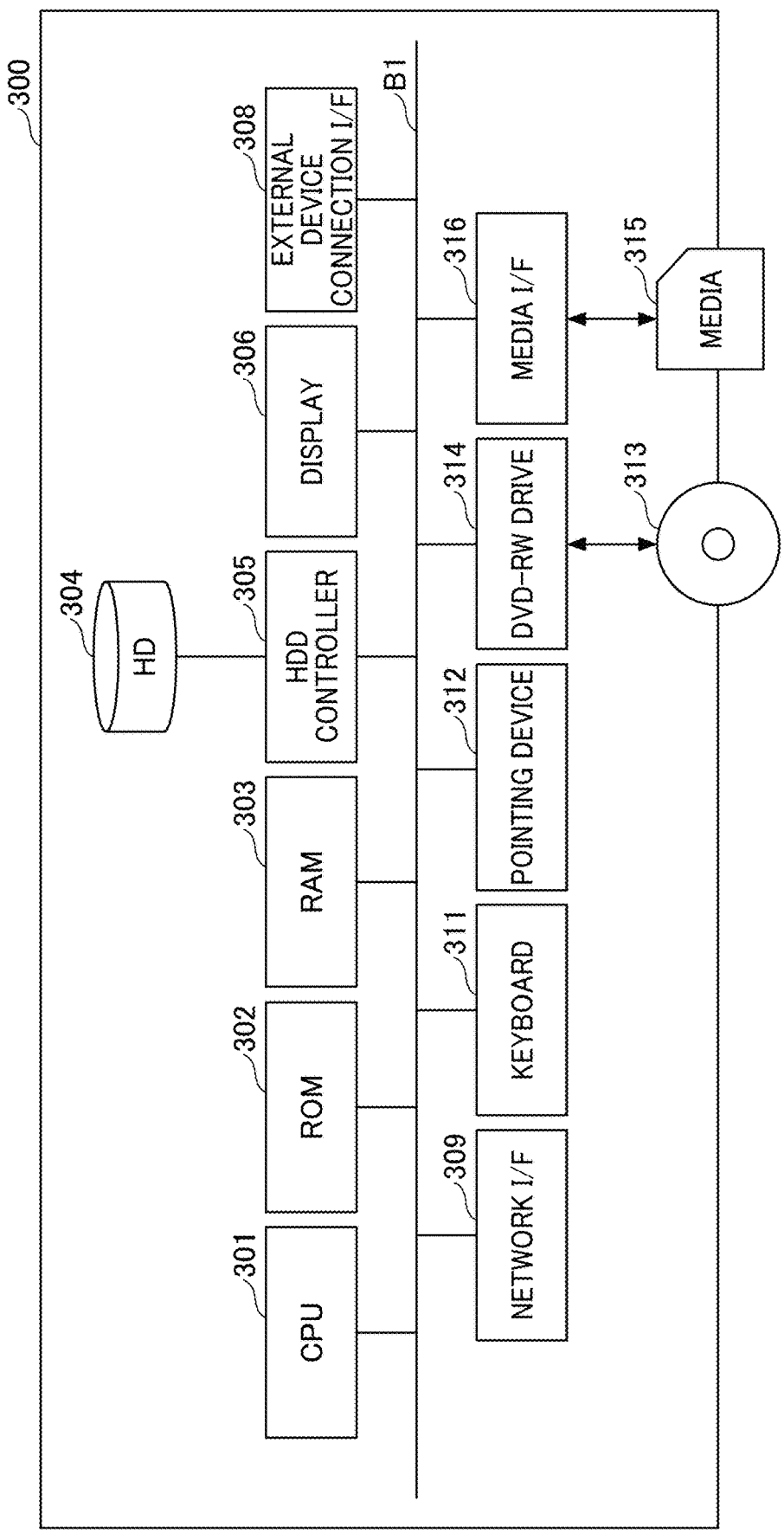
FIG. 2 illustrates an example of a hardware configuration of an information processing apparatus.

FIG. 2 illustrates an example of the hardware configuration of the information processing apparatus. FIG. 2 illustrates an example of the hardware configuration of the form management apparatus 300 that is a second information processing apparatus.

The form management apparatus 300 is implemented by a computer. As illustrated in FIG. 2, the form management apparatus 300 includes the central processing unit (CPU) 301, a read only memory (ROM) 302, a random access memory (RAM) 303, a hard disk (HD) 304, a hard disk drive (HDD) controller 305, a display 306, an external device connection interface (I/F) 308, a network I/F 309, a bus line B1, a keyboard 311, a pointing device 312, a digital versatile disk rewritable (DVD-RW) drive 314, and a media I/F 316.

Among these components, the CPU 301 controls the entire operation of the form management apparatus 300. The ROM 302 stores a control program for controlling the CPU 301, such as an initial program loader (IPL). The RAM 303 is used as a work area for the CPU 301. The HD 304 stores various data such as a control program. The HDD controller 305 controls reading or writing of various data to or from the HD 304 under control of the CPU 301. The display 306 displays various pieces of information such as a cursor, a menu, a window, a character, or an image. The external device connection I/F 308 is an interface for coupling to various external devices. Examples of the external devices include a Universal Serial Bus (USB) memory and a printer. The network I/F 309 is an interface that controls communication of data through a communication network. The bus line B1 is, for example, an address bus or a data bus, which electrically connects the elements, such as the CPU 301 illustrated in FIG. 2, each other.

The keyboard 311 is one example of an input device provided with a plurality of keys for allowing a user to input characters, numerals, or various instructions. The pointing device 312 is an example of an input device that allows the user to select or execute a specific instruction, select a target of a process, or move a cursor being displayed. The DVD-RW drive 314 reads or writes various data from or to a DVD-RW 313, which is an example of a removable recording medium. The removable recording medium is not limited to the DVD-RW and may be a digital versatile disc-recordable (DVD-R) or the like. The media i/F 316 controls reading or writing (storing) of data from or to a storage medium 315 such as a flash memory.

Hardware configurations of the terminal device (billing source terminal) 400 and the terminal device (billing destination terminal) 500 according to the present embodiment are described below referring to FIG. 3. Since the terminal device 400 and the terminal device 500 of the present embodiment are general-purpose terminal devices (such as portable phone), the hardware configuration of the terminal device 500 is described as an example of the hardware configuration of the terminal device in FIG. 3.

Figure 3:
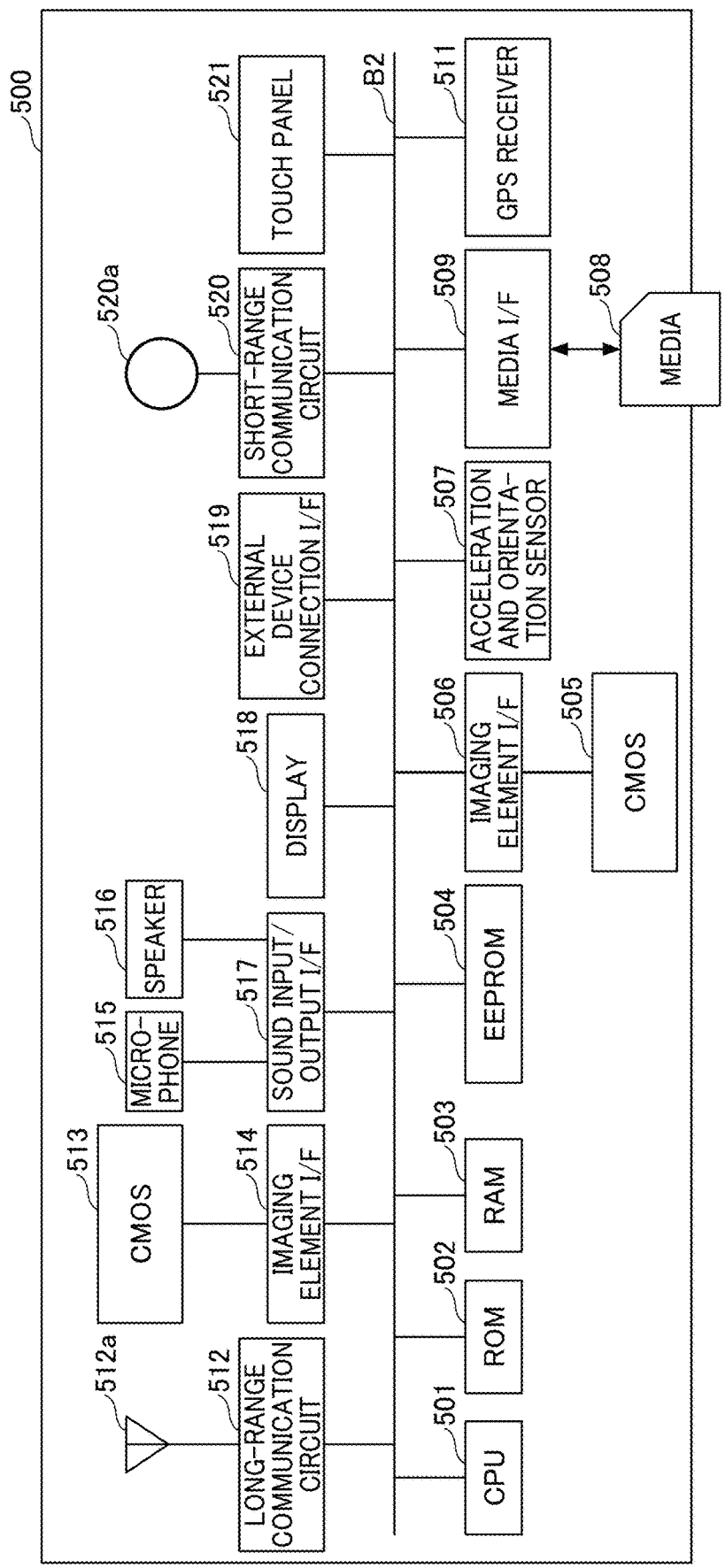
FIG. 3 illustrates an example of a hardware configuration of a terminal device.

FIG. 3 illustrates an example of the hardware configuration of the terminal device. FIG. 3 illustrates an example of the hardware configuration of the billing destination terminal 500.

The terminal device 500 of the present embodiment includes a CPU 501, a ROM 502, a RAM 503, an electrically erasable programmable read-only memory (EEPROM) 504, a complementary metal-oxide semiconductor (CMOS) sensor 505, an imaging element I/F 506, an acceleration and orientation sensor 507, a media I/F 509, and a global positioning system (GPS) receiver 511.

Among these components, the CPU 501 controls the entire operation of the terminal device 500. The ROM 502 stores a control program for controlling the CPU 501, such as an IPL. The RAM 503 is used as a work area for the CPU 501. The EEPROM 504 reads or writes various data such as a control program for a smartphone under control of the CPU 501. The ROM 502, the RAM 503, and the EEPROM 504 are examples of a storage device of the terminal device 500.

The CMOS sensor 505 is an example of a built-in imaging device configured to capture a subject (mainly, a self-image) under control of the CPU 501 to obtain image data. In alternative to the CMOS sensor 505, an imaging device such as a charge-coupled device (CCD) sensor may be used.

The imaging element I/F 506 is a circuit that controls driving of the CMOS sensor 505. Examples of the acceleration and orientation sensor 507 include an electromagnetic compass or a gyrocompass for detecting geomagnetism and an acceleration sensor. The media I/F 509 controls reading or writing (storing) of data from or to a storage medium 508 such as a flash memory. The GPS receiver 511 receives a GPS signal from a GPS satellite.

The terminal device 500 also includes a long-range communication circuit 512, an antenna 512a of the long-range communication circuit 512, a CMOS sensor 513, an imaging element I/F 514, a microphone 515, a speaker 516, a sound input/output I/F 517, a display (display device) 518, an external device connection I/F 519, a short-range communication circuit 520, an antenna 520a of the short-range communication circuit 520, and a touch panel 521.

Among these components, the long-range communication circuit 512 communicates with another device through a communication network. The CMOS sensor 513 is an example of a built-in imaging device configured to capture a subject under control of the CPU 501 to obtain image data. The imaging element I/F 514 is a circuit that controls driving of the CMOS sensor 513. The microphone 515 is a built-in circuit that converts sound into an electric signal. The speaker 516 is a built-in circuit that generates sound such as music or voice by converting an electric signal into physical vibration. The sound input/output I/F 517 is a circuit that processes inputting or outputting of a sound signal between the microphone 515 and the speaker 516 under control of the CPU 501.

The display 518 is an example of a display device that displays an image of a subject, various icons, and so forth. Examples of the display 518 include a liquid crystal display (LCD) and an organic electroluminescence (EL) display. The external device connection I/F 519 is an interface for connecting to various external devices. The short-range communication circuit 520 is a communication circuit that communicates in compliance with the near field communication (NFC), the Bluetooth (registered trademark), and so forth. The touch panel 521 is an example of an input device configured to enable a user to operate the terminal device 500 by pressing a screen of the display 518. The display 518 is an example of a displaying unit included in the terminal device 500.

Databases included in the transaction management apparatus 200 are described next referring to FIGS. 4 to 6. FIG. 4 is a table as an example of the customer management database 210.

The customer management database 210 of the present embodiment is provided, for example, for each tenant A. The customer management database 210 of the present embodiment includes, as items of information, a name, an address, a telephone number, an email address, and a name of a person in charge. The items am associated with a tenant ID and a tenant name of the tenant A.

In the present embodiment, information including values of the items such as the name, the address, the telephone number, the email address, and the name of the person in charge in the customer management database 210 may be expressed as customer information. The tenant ID and the tenant name are information for identifying the tenant A. The value of the item "name" indicates the name of a customer (billing destination), and the values of the items "address", "telephone number", "email address", and "name of person in charge" respectively indicate the address, the telephone number, the e-mail address, and the name of the person in charge of a transaction of the billing destination.

The items of information included in the customer information are not limited to the example illustrated in FIG. 4. The items of information included in the customer information need not include all the items illustrated in FIG. 4, or may include items other than the items illustrated in FIG. 4.

The customer information of the present embodiment is stored in the customer management database 210, in response to the transaction management apparatus 200 receiving an input from the billing source terminal 400.

FIG. 5 is an example table of the invoice database 220. The invoice database 220 of the present embodiment may be provided for each tenant A similarly to the customer management database 210.

The invoice database 220 includes, as items of information, a form ID, a billing destination, a billing amount, a billing date, a payment due date, description information, and transfer destination information, and each item is associated with the tenant ID and the tenant name of the tenant A.

In the invoice database 220, the item "form ID" is associated with the other items. In the present embodiment, information including the value of the item "form ID" and the values of the other items in the invoice database 220 is referred to as invoice information.

In other words, the invoice database 220 is an example of a form information storage unit in which information for identifying an input source (tenant A) of invoice information (form information) is associated with the form information.

In the present embodiment, when a value of an item other than the form ID is input from the terminal device 400, a form ID is generated, and invoice information including the form ID is stored in the invoice database 220.

The value of the item "form ID" is form identification information for identifying a form (invoice). In other words, the value of the item "form ID" is form identification information for identifying form information.

The value of the item "billing destination" indicates the name of a billing destination of the invoice identified using the form 10. The values of the items "billing amount", "billing date", and "payment due date" indicate a billing amount, a billing date, and a payment due date described in the invoice.

The item "description information" is associated with items indicative of a breakdown of the billing amount, such as items "product code", "product name", and "quantity". The values of the item "description information" indicate the breakdown of the billing amount.

The item "transfer destination information" is associated with items indicative of the transfer destination of the billing amount, such as items "bank name", "branch name", "account type", and "account number". The values of the item "transfer destination information" indicate the transfer destination of the billing amount.

The items of information included in the invoice information are not limited to the example illustrated in FIG. 5. The items of information included in the invoice information need not include all the items illustrated in FIG. 5, or may include items other than the items illustrated in FIG. 5.

FIG. 6 is an example table of the embedment management database 230. The embedment management database 230 of the present embodiment includes, as items of information, an embedment position (upper left), an embedment position (lower right), an embedment type, an embedment content, an encryption key, and so forth. In the following description, information including the value of each item in the embedment management database 230 may be referred to as embedment information. The embedment information is information stored in the embedment management database 230 in advance by the tenant A, and is referenced when the form management apparatus 300 embeds an embedment code.

The values of the item "embedment position (upper left)" and the item "embedment position (lower right)" are information for identifying the position at which an embedment code is embedded in a form image. Specifically, the values of the item "embedment position (upper left)" and the item "embedment position (lower right)" indicate, for example, the coordinates indicative of the position of the upper left vertex of a QR code (registered trademark) in a form image and the coordinates indicative of the position of the lower right vertex of the QR code (registered trademark) in the form image.

The value of the item "embedment type" indicates the type of the embedment code embedded in the form image. The value of the item "embedment content" indicates information embedded in the embedment code. In the present embodiment, the information indicated by the embedment code is a form ID.

The value of the item "encryption key" may be referenced when the form management apparatus 300 reads the form ID from the embedment code.

The embedment information need not include the encryption key. The encryption key may be referenced, for example, when form image data indicative of an invoice is transmitted to the billing destination terminal 500 via a network or the like.

In the present embodiment, the embedment management database 230 is provided in the transaction management apparatus 200; however, the embedment management database 230 does not have to be provided just in the transaction management apparatus 200.

The embedment management database 230 may be provided in, for example, both the transaction management apparatus 200 and the form management apparatus 300. Specifically, for example, when the form management apparatus 300 receives form image data from the billing destination terminal 500 via a network, the position of an embedment code in a form image of the form image data may be identified with reference to the embedment management database 230 provided in the form management apparatus 300, and a form ID may be read from the embedment code.

The invoice management database 310 included in the form management apparatus 300 is described next. FIG. 7 is an example table of the invoice management database 310.

The invoice management database 310 of the present embodiment is provided for each tenant B. The invoice management database 310 includes, as items of information, a form ID, a billing source, a billing amount, a payment due date, description information, and journal information.

In other words, the invoice management database 310 includes, as items of information, items included in the invoice information, journal information, and so forth.

The item "journal information" is associated with various items related to journalizing, and the values of the item "journal information" include various items related to the journalizing and the values of the items. The journal information is information that is input to the form management apparatus 300 by the billing destination terminal 500, which is a terminal of a recipient that has received an invoice, and is management information for managing the invoice. In other words, the journal information is management information for managing a form input by a recipient of the form.

In the present embodiment, information in which invoice information is associated with management information in the invoice management database 310 may be referred to as invoice management information.

In other words, the invoice management information is an example of form management information in which form information indicative of the content of a form is associated with management information for managing the form.

In the example of FIG. 7, the journal information is illustrated as the management information on the invoice; however, the management information may include information other than the journal information. Specifically, for example, the management information may include information related to payment, such as account information of a transfer destination of a billing amount and date of execution of the transfer. When the form is a delivery slip or the like, the management information may include, for example, purchase information.

The invoice management information according to the present embodiment may include, as an item of information, an item indicative of a state of invoice management information.

The state of the invoice management information is, for example, a progress state of confirmation work of invoice management information in the billing destination.

In the present embodiment, the state of the invoice management information includes four states of an unprocessed state, a draft stored state, a determined state, and an external output completed state. The respective states are as follows.

The unprocessed state (state 1) is a state that is immediately after invoice information has been acquired and in which, for example, input of journal information has not been performed.

The draft stored state (state 2) is a state that is in the middle of an operation such as confirmation of invoice management information and is before the invoice management information is determined.

The determined state (state 3) is a state in which the operation such as the confirmation of the invoice management information has been completed and the information has been stored in the invoice management database 310 as determined information.

The external output completed state (state 4) is a state in which output of the invoice management information to the backbone system 600 has been completed.

Figure 8:
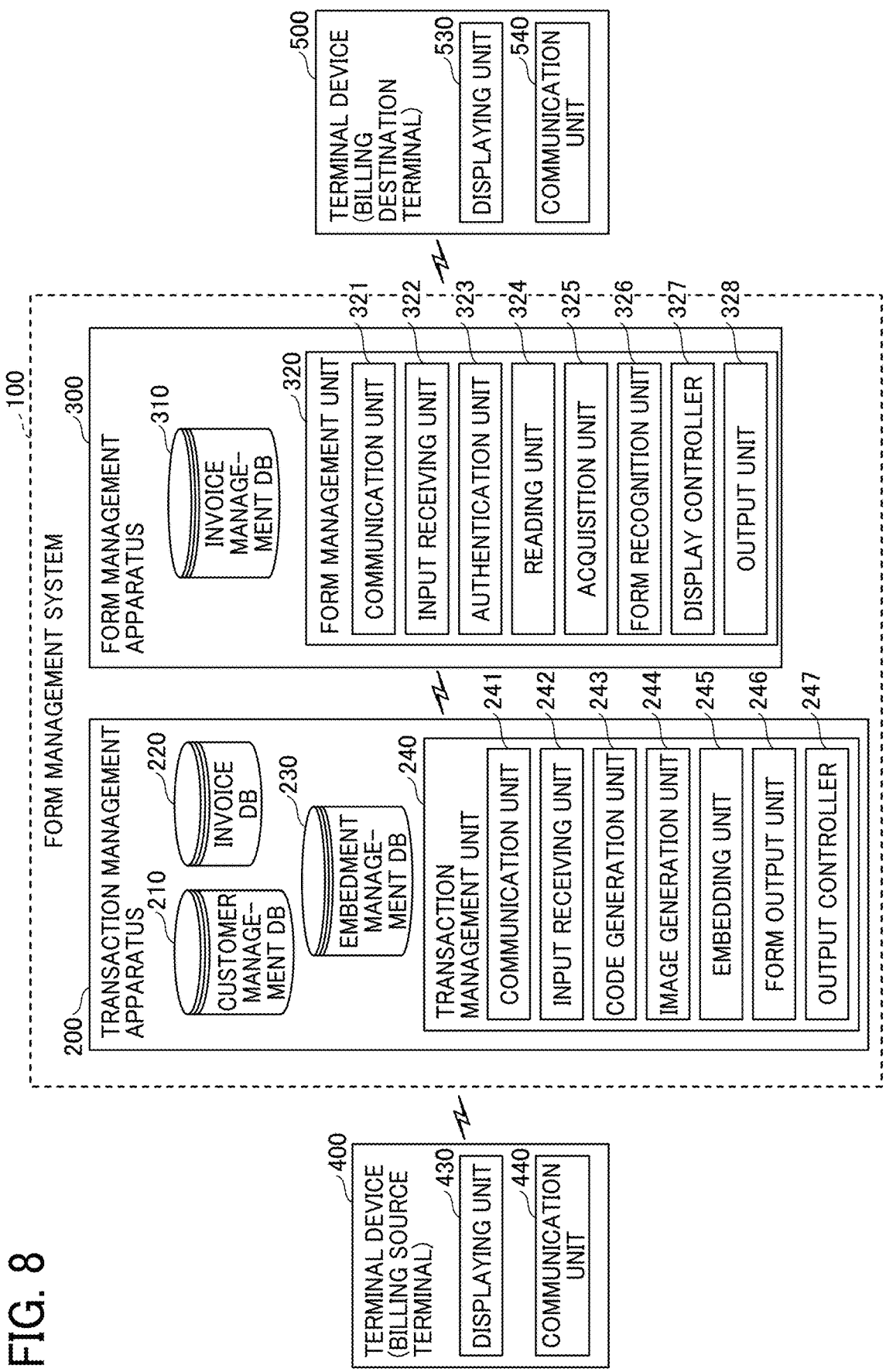
FIG. 8 illustrates functions of apparatuses and devices included in a form management system according to the first embodiment.

Functions of the apparatuses and devices included in the form management system 100 according to the present embodiment are described next referring to FIG. 8. FIG. 8 illustrates functions of the apparatuses and devices included in the form management system 100 according to the first embodiment.

Functions of the transaction management apparatus 200 are described first. The transaction management unit 240 of the transaction management apparatus 200 according to the present embodiment includes a communication unit 241, an input receiving unit 242, a code generation unit 243, an image generation unit 244, an embedding unit 245, a form output unit 246, and an output controller 247.

The communication unit 241 transmits or receives information to or from the transaction management apparatus 200 and another apparatus. The input receiving unit 242 receives various inputs to the transaction management apparatus 200. Specifically, the input receiving unit 242 receives inputs and requests for various pieces of information from the billing source terminal 400.

The code generation unit 243 generates a code to be embedded in a form image. In the following description, a QR code is described as an example of the code generated by the code generation unit 243; however, the code generated by the code generation unit 243 is not limited to the QR code. The code generated by the code generation unit 243 may be any code as long as the code indicates a form ID and can be embedded in a form image.

The image generation unit 244 generates image data (form image data) indicative of an invoice based on invoice information input from the billing source terminal 400.

The embedding unit 245 embeds the QR code generated by the code generation unit 243 in the form image data to generate form image data including the embedment code.

The form output unit 246 outputs the form image data including the QR code. For example, the form output unit 246 of the present embodiment may transmit the form image data including the QR code to an image forming apparatus or the like, and may output the form image data as a print. The form output unit 246 may transmit the form image data including the QR code to the billing destination terminal 500.

When receiving an acquisition request for invoice information from the form management apparatus 300, the output controller 247 determines whether to output (transmit) the requested invoice information to the form management apparatus 300. When the output controller 247 determines to output the requested invoice information, the output controller 247 outputs an invoice to the form management apparatus 300.

Functions of the form management apparatus 300 are described next. The form management unit 320 of the form management apparatus 300 according to the present embodiment includes a communication unit 321, an input receiving unit 322, an authentication unit 323, a reading unit 324, an acquisition unit 325, a form recognition unit 326, a display controller 327, and an output unit 328.

The communication unit 321 transmits or receives information to or from the form management apparatus 300 and another apparatus. The input receiving unit 322 receives various inputs to the form management apparatus 300. Specifically, the input receiving unit 322 receives inputs and requests for various pieces of information from the billing destination terminal 500.

The authentication unit 323 authenticates a billing destination based on, for example, login information input from the billing destination terminal 500. The authentication unit 323 may hold the login information for authenticating the billing destination and information (tenant name) or the like for identifying the billing destination (tenant B) in association with each other.

When the input receiving unit 322 receives an input of form image data, the reading unit 324 reads a form ID from a QR code included in the form image data.

In the form management apparatus 300, when the reading unit 324 reads the form ID, the communication unit 321 transmits an acquisition request for invoice information including the read form ID, information (tenant name) for identifying a billing destination of an invoice, and so forth to the transaction management apparatus 200.

The acquisition unit 325 requests the transaction management apparatus 200 to acquire invoice information corresponding to the form ID, and acquires the invoice information corresponding to the form ID read by the reading unit 324.

The form recognition unit 326 determines whether the acquisition unit 325 has acquired the invoice information, and when the acquisition unit 325 has not acquired the invoice information, performs form recognition on the input form image data, and sets a recognition result as the invoice information.

The case where the invoice information has not been acquired includes a case where the form image data is created by a system or the like other than the form management system 100 and does not include the QR code, or a case where reading of the QR code has failed.

Form recognition according to the present embodiment is a process of extracting a name of an item (item name) included in a form image indicated by form image data and a value of the item (item value), converting the item and the value of the item into text data, and associating the text data.

The display controller 327 controls display on the billing destination terminal 500. Specifically, the display controller 327 causes the billing destination terminal 500 to display a screen including one of the invoice information acquired from the transaction management apparatus 200 and the invoice information extracted as the result of the form recognition by the form recognition unit 326, and an input field of management information.

The output unit 328 outputs invoice management information stored in the invoice management database 310 to the backbone system 600 or the like.

Functions of the billing source terminal 400 and the billing destination terminal 500 are described next. The billing source terminal 400 of the present embodiment includes a displaying unit 430 and a communication unit 440. The displaying unit 430 displays information on the display of the billing source terminal 400. The communication unit 440 transmits or receives information between the billing source terminal 400 and another apparatus.

The billing destination terminal 500 of the present embodiment includes a displaying unit 530 and a communication unit 540. The displaying unit 530 displays information on the display of the billing destination terminal 500. The communication unit 540 transmits or receives information between the billing destination terminal 500 and another apparatus.

Figure 9:
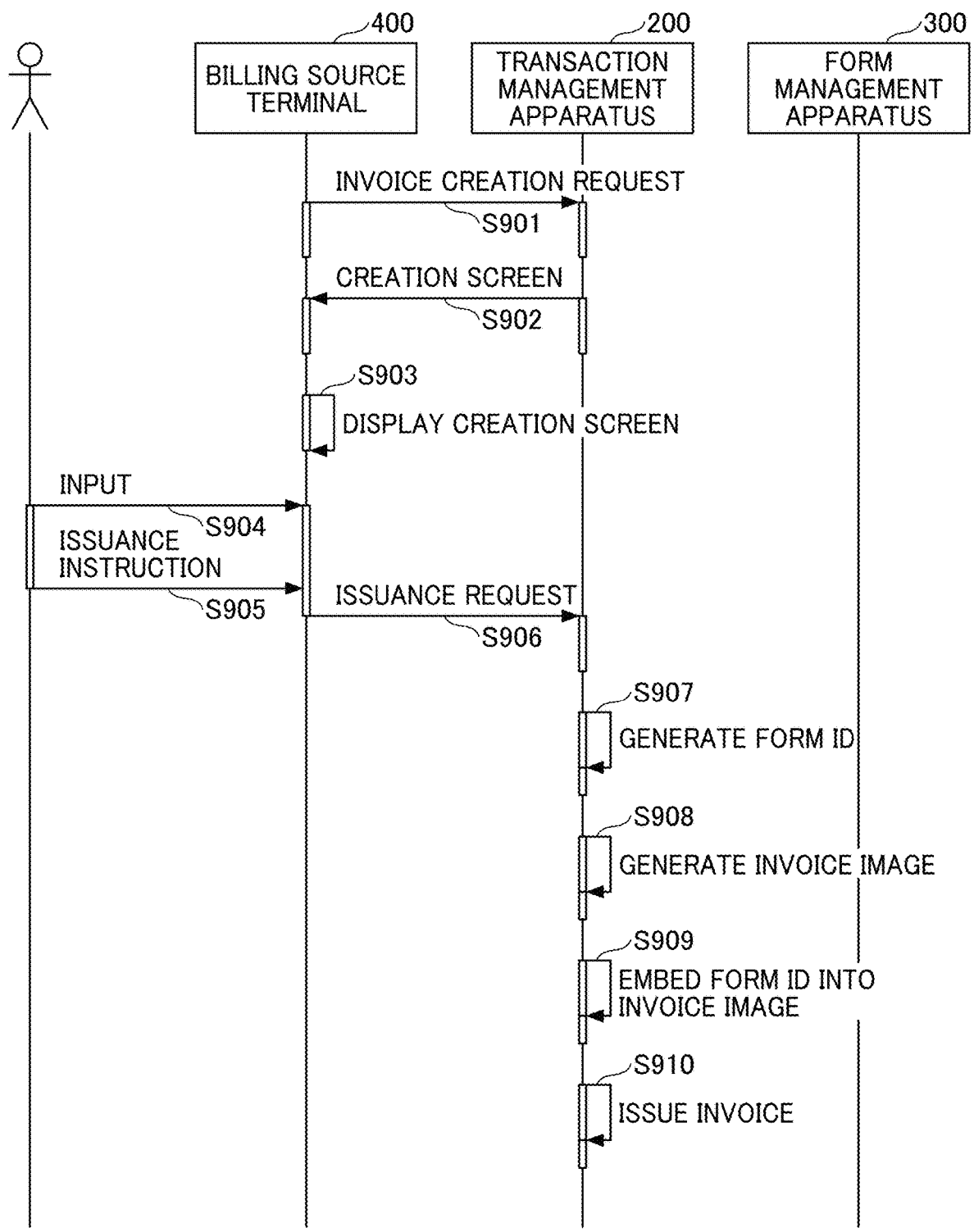
FIG. 9 is a first sequence diagram illustrating an operation of the form management system according to the first embodiment.

An operation of the form management system 100 according to the present embodiment is described next referring to FIGS. 9 to 11. FIG. 9 is a first sequence diagram illustrating an operation of the form management system 100 according to the first embodiment. FIG. 9 illustrates an operation until an invoice is issued in the form management system 100.

In the form management system 100 of the present embodiment, the billing source terminal 400 transmits an invoice creation request to the transaction management apparatus 200 in response to an operation from the tenant A (step S901).

When the input receiving unit 242 of the transaction management apparatus 200 receives the invoice creation request, the transaction management apparatus 200 transmits a display instruction for a creation screen for an invoice to the billing source terminal 400 (step S902). When the billing source terminal 400 receives the display instruction for the creation screen, the displaying unit 430 displays the creation screen for the invoice on the display (step S903). The details of the creation screen will be described later.

Then, the billing source terminal 400 receives an input of invoice information from the tenant A (step S904). Then, the billing source terminal 400 receives an input of an issuance instruction for an invoice from the tenant A (step S905).

When receiving the issuance instruction for the invoice, the billing source terminal 400 transmits the input invoice information and an issuance request for an invoice including the invoice information to the transaction management apparatus 200 (step S906). The issuance request may include information for identifying the tenant A that uses the billing source terminal 400. The information for identifying the tenant A is, for example, a tenant ID or a tenant name.

In the transaction management apparatus 200, when the input receiving unit 242 receives the issuance request and the invoice information, the code generation unit 243 generates a QR code indicative of a form ID to be included in the invoice information (step S907). At this time, the code generation unit 243 includes the generated form ID in the invoice information received from the billing source terminal 400 and stores the invoice information in the invoice database 220.

Then, the image generation unit 244 of the transaction management apparatus 200 generates image data indicative of an invoice based on the received invoice information (step S908). In other words, the image generation unit 244 generates form image data.

Then, in the transaction management apparatus 200, the embedding unit 245 embeds the QR code at the position indicated by embedment management information in the form image with reference to the embedment management database 230 (step S909).

Then, the form output unit 246 of the transaction management apparatus 200 issues the invoice including the QR code (step S910). In other words, the form output unit 246 of the transaction management apparatus 200 outputs the form image data including the QR code.

Figure 10:
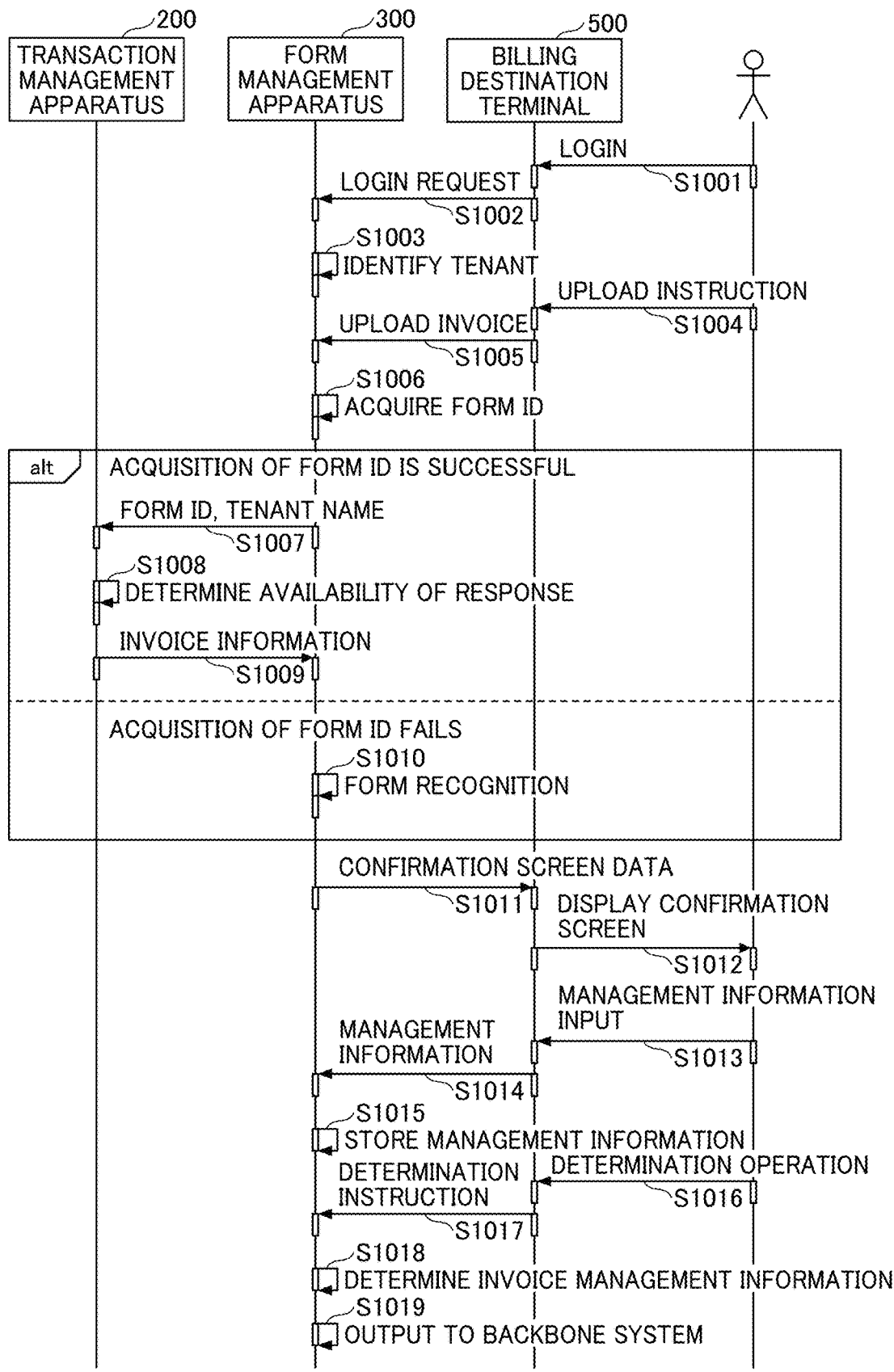
FIG. 10 is a second sequence diagram illustrating an operation of the form management system according to the first embodiment.
Figure 11:
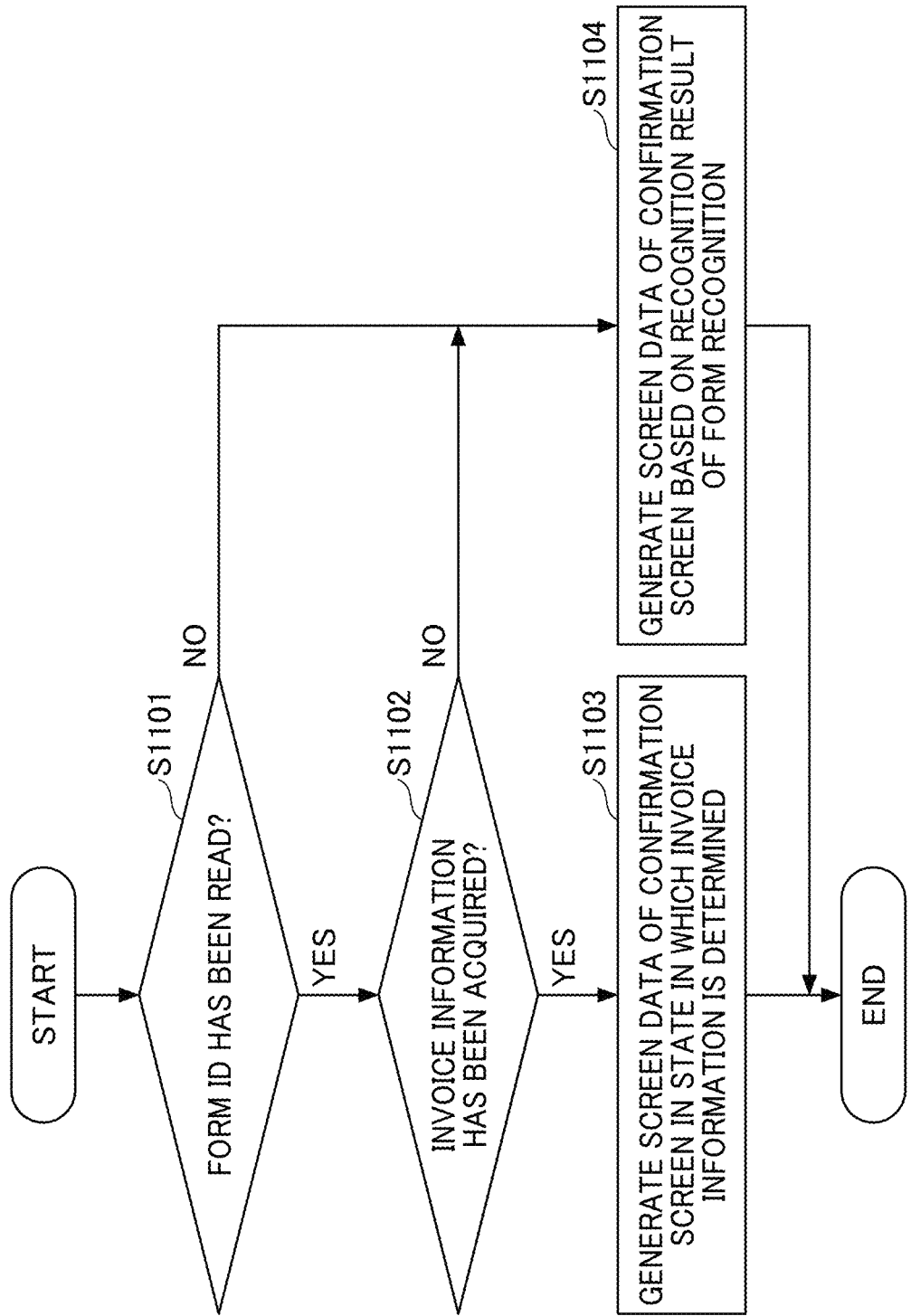
FIG. 11 is a flowchart illustrating a process of displaying a confirmation screen.

FIG. 10 is a second sequence diagram illustrating an operation of the form management system 100 according to the first embodiment. FIG. 10 illustrates an operation until invoice management information is output to the backbone system 600 in the form management system 100.

In the form management system 100, when the billing destination terminal 500 receives an input of login information from a recipient of an invoice (step S1001), the billing destination terminal 500 transmits a login request to the form management apparatus 300 (step S1002).

The login request includes the input login information or the like.

In the form management apparatus 300, when the input receiving unit 322 receives the login request, the authentication unit 323 performs authentication, and identifies, for example, the tenant name of a billing destination (tenant B) corresponding to the login information based on the login information or the like received together with the login request (step S1003).

Then, the billing destination terminal 500 receives an upload operation of form image data from the billing destination (step S1004), and uploads (transmits) the form image data to the form management apparatus 300 (step S1005).

The form image data uploaded from the billing destination terminal 500 may be form image data including a QR code transmitted from the billing source terminal 400 to the billing destination terminal 500. The form image data uploaded from the billing destination terminal 500 may be form image data generated by reading an invoice output as a print with a scanner or the like in response to an issuance request for an invoice from the billing source terminal 400.

When the form management apparatus 300 receives the form image data, the reading unit 324 reads the QR code included in the form image data and acquires a form ID indicated by the QR code (step S1006).

Then, the acquisition unit 325 of the form management apparatus 300 transmits an acquisition request for invoice information including the form ID and the tenant name of the tenant B to the transaction management apparatus 200 (step S1007).

When the transaction management apparatus 200 receives the form ID and the tenant name of the tenant B, the output controller 247 determines whether invoice information in which the value of the item "form ID" matches the received form ID and the value of the item "billing destination" matches the received tenant name is present in the invoice database 220 (step S1008).

The example of FIG. 10 illustrates an operation when the invoice information in which the value of the item "form ID" matches the received form ID and the value of the item "billing destination" matches the received tenant name is present in the invoice database 220.

Subsequent to step S1008, in the transaction management apparatus 200, the output controller 247 extracts, from the invoice database 220, the invoice information in which the value of the item "form ID" and the value of the item "billing destination" respectively match the received form ID and the received tenant name, and outputs the extracted invoice information to the form management apparatus 300 (step S1009).

When the corresponding invoice information is not present in the invoice database 220, the output controller 247 may transmit an error notification or the like to the form management apparatus 300.

In step S1007, the acquisition request transmitted from the form management apparatus 300 to the transaction management apparatus 200 need not include the tenant name of the tenant B. In this case, the transaction management apparatus 200 determines in step S1008 whether invoice information in which the value of the item "form ID" matches the received form ID is present, extracts the invoice information determined to match in step S1009, and outputs the extracted invoice information to the form management apparatus 300.

Then, the form management apparatus 300 may perform processes in and after step S1011 based on the acquired invoice information, or may perform control to determine whether the value of the item "billing destination" included in the acquired invoice information matches the tenant name of the tenant B identified by the authentication unit 323, and execute processes in and after step S1011 when the values match, or display an error screen or the like when the values do not match.

In step S1006, when the form ID is not acquired from the form image data, the form recognition unit 326 of the form management apparatus 300 performs form recognition on the form image data and holds the recognition result as invoice information (step S1010). When the form management apparatus 300 receives an error notification or the like from the transaction management apparatus, or when the value of the item "billing destination" included in the acquired invoice information does not match the tenant name of the tenant B identified by the authentication unit 323, the form recognition unit 326 may perform form recognition on the form image data and hold the recognition result as invoice information, similarly to the case where the form ID is not acquired from the form image data.

Then, in the form management apparatus 300, when the acquisition unit 325 acquires the invoice information, the display controller 327 transmits information for displaying a confirmation screen including the invoice information to the billing destination terminal 500 (step S1011).

The billing destination terminal 500 receives the information and displays the confirmation screen (step S1012). The display controller 327 may display the invoice information in a different display mode (such as in a different appearance) on the confirmation screen depending on the way of acquiring the invoice information. The details of the process of the display controller 327 and the confirmation screen will be described later.

The billing destination terminal 500 receives an input of journal information (management information) or the like for managing the invoice on the confirmation screen (step S1013).

Then, the billing destination terminal 500 transmits the input journal information to the form management apparatus 300 (step S1014).

When the form management apparatus 300 receives the journal information, the form management apparatus 300 associates the invoice information with the journal information, and stores the resultant information as invoice management information in which the invoice information is associated with the journal information in the invoice management database 310 (step S1015).

Then, when the billing destination terminal 500 receives an operation of changing the state of the invoice management information to the "determined state" (step S1016), the billing destination terminal 500 transmits a determination instruction of the invoice management information to the form management apparatus 300 (step S1017).

When the form management apparatus 300 receives the determination instruction of the invoice management information, the form management apparatus 300 changes the state of the invoice management information stored in the invoice management database 310 to the "determined state" (step S1018).

Then, the output unit 328 of the form management apparatus 300 outputs the determined invoice management information to the backbone system 600 (step S1019).

The determined invoice management information may be output as data in a predetermined format, such as comma separated value (CSV) data or eXtensible Markup Language (XML) data, to the billing destination terminal 500 that is an external system (external device). The billing destination terminal 500 may output the output data to the backbone system 600 in response to an operation of the user. One of the invoice information and the management information included in the determined invoice management information may be output to the backbone system 600 or the billing destination terminal 500.

As described above, in the present embodiment, the invoice information based on the QR code included in the form image data input from the billing destination terminal 500 is acquired, and the invoice information is included in the invoice management information. Thus, in the present embodiment, the information included in the form image can be acquired with high accuracy, and highly accurate information can be provided to the backbone system 600 which is an external system.

In the example of FIG. 10, the input of the journal information (management information) and the operation of changing the state of the invoice management information to the "determined state" have been described as a series of operations; however, the input of the journal information and the operation of changing the invoice management information to the determined state do not have to be included in a series of operations. The input of the journal information and the operation of changing the invoice management information to the determined state may be performed at respective independent timings.

In the example of FIG. 10, the operation of outputting the invoice management information to the backbone system 600 after the state of the invoice management information is changed to the "determined state" has been described as a series of operations; however, the operations included in the series of operations are not limited to the above-described operations. After the state of the invoice management information is changed to the "determined state", the output unit 328 of the form management apparatus 300 may output the invoice management information to the backbone system 600 from the billing destination terminal 500 in response to an operation of instructing to output the invoice management information.

A process of displaying a confirmation screen by the display controller 327 of the form management apparatus 300 is described next referring to FIG. 11. FIG. 11 is a flowchart illustrating the process of displaying the confirmation screen. FIG. 11 illustrates the details of the process of the display controller 327 in step S1011 in FIG. 10.

In the form management apparatus 300 of the present embodiment, the display controller 327 determines whether a form ID has been acquired from form image data (step S1101). In step S1101, when the form ID has not been acquired, the operation proceeds to step S1104 (described later). The case where the form ID is not acquired is, for example, a case where reading of the QR code fails.

In step S1101, when the form ID has been acquired, the display controller 327 determines whether the acquisition unit 325 has acquired invoice information associated with the form ID (step S1102). In step S1102, when the invoice information corresponding to the form ID has been acquired, the display controller 327 generates information for displaying a confirmation screen in a state in which editing of the invoice information is prohibited (step S1103), and transmits the information to the billing destination terminal 500.

In step S1102, when the invoice information corresponding to the form ID has not been acquired, the display controller 327 performs form recognition using the form recognition unit 326, generates information for displaying a confirmation screen including the invoice information acquired as the recognition result (step S1104), and transmits the information to the billing destination terminal 500.

The case where the invoice information corresponding to the form ID has not been acquired is a case where the invoice information in which the form ID and the tenant name requested to be acquired match is not present in the invoice database 220.

In the present embodiment, as described above, only when the invoice information in which the form ID and the tenant name requested to be acquired match is present in the invoice database 220, the invoice information acquired from the invoice database 220 is displayed on the confirmation screen in the state in which editing is prohibited.

Figure 12:
FIG. 12 illustrates an example of a creation screen for an invoice.

Display examples of the present embodiment are described below referring to FIGS. 12 and 13. FIG. 12 illustrates an example of a creation screen for an invoice.

A screen 121 illustrated in FIG. 12 is an example of a creation screen displayed on the billing source terminal 400 in step S902 in FIG. 9.

The screen 121 includes a display region 122 and an operation button 123. The display region 122 includes an input field for inputting a value of an item included in invoice information. The operation button 123 is an operation button for transmitting an issuance request for an invoice to the transaction management apparatus 200.

In the present embodiment, when a value is input to the input field displayed in the display region 122 and the operation button 123 is operated on the screen 121, form image data indicative of an invoice image 125 is generated. The invoice image 125 includes invoice information 126 and a QR code 127.

The position of the QR code 127 in the invoice image 125 is determined based on embedment management information stored in the embedment management database 230.

In the present embodiment, as described above, since the QR code 127 indicative of a form ID for identifying the invoice image 125 is embedded in the invoice image 125, the invoice information 126 and the form image data indicative of the invoice image 125 can be associated with each other based on the form ID.

FIG. 13 illustrates an example of a confirmation screen. A screen 131 illustrated in FIG. 13 describes an example of a screen displayed on the billing destination terminal 500 in step S1011 in FIG. 10. Thus, the billing destination terminal 500 can be referred to as an example of a display device that displays the invoice management information output from the form management apparatus 300.

FIG. 13 illustrates an example of the confirmation screen when a form ID is read from a QR code of form image data, and invoice information corresponding to the read form ID is acquired from the transaction management apparatus 200.

The screen 131 includes a display field 132, a display field 133, and operation buttons 137, 138, and 139. In the display field 132, a form image indicated by the form image data is displayed. In the example of FIG. 13, the form is an invoice, and the form image includes the invoice information 126 and the QR code 127.

In the display field 133, invoice information corresponding to the form ID read from the QR code 127 included in the form image displayed in the display field 132, and an input field of journal information are displayed.

The display field 133 includes display fields 134, 135, 136, and 140. In the display field 134, the invoice information 126 is displayed. The invoice information 126 is information acquired from the invoice database 220 based on the form ID read from the QR code. In other words, the invoice information 126 is information input to the transaction management apparatus 200 from the billing source terminal 400 when the invoice is created. Thus, in the example of FIG. 13, in the display field 134, the invoice information 126 in the state in which editing is prohibited is displayed.

Specifically, in FIG. 13, the display field 134 is grayed out so that it is easily recognizable that editing is prohibited. Note that the display mode of the display field 134 may be any display mode other than the gray-out display mode as long as the display mode differs from the display mode of the other display fields when editing of the invoice information 126 is prohibited.

In the present embodiment, since the display mode of the invoice information differs depending on the way of acquiring the invoice information displayed on the confirmation screen, the user of the billing destination terminal 500 can visually recognize the accuracy of the invoice information. Thus, when the user of the billing destination terminal 500 compares the invoice image displayed in the display field 132 with the invoice information displayed in the display field 134, the user can easily determine whether the invoice image and the invoice information are required to be carefully compared with each other.

In the display field 135, an input field for journal information is displayed. The display field 136 displays the state of the invoice management information. In the example of FIG. 13, it is found that the state of the invoice management information is the "draft stored state" from the display in the display field 136.

The display field 140 displays the rate of accuracy when the invoice information 126 displayed in the display field 134 is compared with the invoice information stored in the invoice database 220. In the example of FIG. 13, the invoice information 126 is information stored in the invoice database 220 of the transaction management apparatus 200. In other words, the invoice information 126 is invoice information input from the billing source terminal 400. Thus, in the present embodiment, "100%" is displayed in the display field 140.

The operation button 137 is an operation button for bringing the invoice information 126 displayed in the display field 134 into an editable state. In the present embodiment, when the operation button 137 is operated on the screen 131, the invoice information 126 displayed in the display field 134 can be edited.

The operation button 138 is an operation button for bringing the state of the invoice management information from the unprocessed state into the draft stored state. When the operation button 138 is operated, the display in the display field 136 changes from "unprocessed" to "draft stored".

The operation button 139 is an operation button for bringing the state of the invoice management information into the determined state. In the present embodiment, when the operation button 139 is operated, the display in the display field 136 changes from "draft stored" to "determined".

In the present embodiment, the invoice management information in the determined state is converted by the output unit 328 into data in a format corresponding to the backbone system 600, and is transmitted to the backbone system 600.

As described above, in the present embodiment, the invoice image including the QR code 127, the invoice information acquired based on the QR code 127, and the management information on the invoice are displayed on one screen.

In the present embodiment, for example, when reading of the QR code 127 fails or when acquisition of the invoice information from the invoice database 220 fails, the result of the form recognition performed by the form recognition unit 326 is displayed in the display field 134. At this time, the invoice information displayed in the display field 134 is displayed in a state in which editing of the invoice information is permitted. In this case, the display field 140 and the operation button 137 need not be displayed.

While the screen 131 is displayed on the billing destination terminal 500, the screen 131 is not limited thereto. For example, the screen 131 may be displayed on the display of the form management apparatus 300. In this case, the screen 131 may be displayed on the display of the form management apparatus 300 in response to that the recipient of the invoice operates the form management apparatus 300.

Next, examples of embedment codes according to the present embodiment are described referring to FIGS. 14A to 14D. FIGS. 14A to 14D illustrate examples of invoices.

Invoices 141 to 144 illustrated in FIGS. 14A to 14D may be, for example, ones output as prints or invoice images.

In the invoice 141 illustrated in FIG. 14A, a QR code 141a is applied as one of embedment codes in a lower right region.

In the invoice 142 illustrated in FIG. 14B, a bar code 142a is applied as one of embedment codes in a lower right region. In the invoice 143 illustrated in FIG. 14C, a form ID 143a is applied as one of embedment codes in a lower right region. In the invoice 144 illustrated in FIG. 14D, a uniform resource locator (URL) 144a indicative of a storage destination of a form ID is applied as one of embedment codes in a lower end region.

In the present embodiment, a QR code or a bar code may be included as an embedment code in an invoice image. In the present embodiment, a form ID or a URL indicative of a storage destination of the form ID may be included as an embedment code in an invoice image. Furthermore, as an embedment code, a difficult-to-view or invisible electronic watermark, such as a copy-forgery-inhibited pattern watermark or a font watermark, may be included in an invoice image.

In the present embodiment, information read from an embedment code is a form ID; however, the information read from the embedment code is not limited to the form ID. In the present embodiment, information other than a form ID may be read from an embedment code. In other words, an embedment code may include information other than a form ID. Specifically, for example, an embedment code may include a portion or the entirety of invoice information.

An embedment code may include a tenant ID or a tenant name of a billing destination (tenant B) of an invoice. In this case, in step S1006 of FIG. 10, the reading unit 324 of the form management apparatus 300 reads the embedment code and acquires the tenant ID or the tenant name of the billing destination (tenant B) indicated by the embedment code. The acquisition unit 325 of the form management apparatus 300 may compare the acquired tenant ID or tenant name of the billing destination (tenant B) with the tenant ID or the tenant name of the tenant B identified by the authentication unit 323, and transmit an acquisition request for invoice information including the form ID to the transaction management apparatus 200 when the tenant ID or the tenant name matches (step S1007), or do not transmit the acquisition request when the tenant ID or tenant name does not match.

As described above, in the present embodiment, when an invoice image is generated, input invoice information is associated with the invoice image using a form ID, and hence the invoice information corresponding to the invoice image can be acquired when invoice image data indicative of the invoice image is acquired. Thus, according to the present embodiment, it is possible to improve the accuracy of information acquired from the form image.

Hereinafter, a second embodiment will be described referring to the drawing. The second embodiment differs from the first embodiment in that the transaction management apparatus 200 and the form management apparatus 300 are implemented by one information processing apparatus. Thus, in the following description of the second embodiment, a reference sign similar to the reference sign used in the description of the first embodiment is applied to a component having a functional configuration similar to that of the first embodiment, and the description thereof is omitted.

Figure 15:
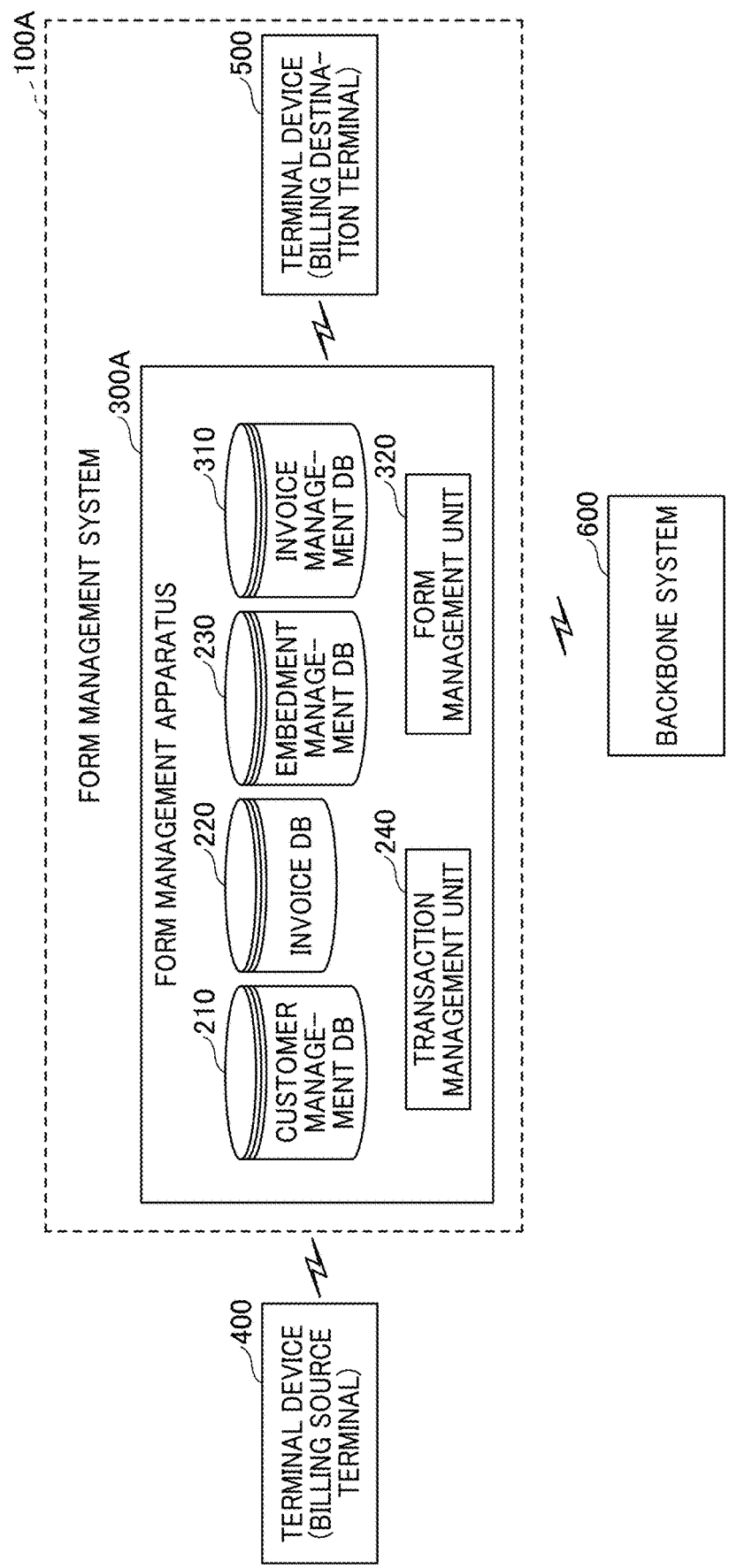
FIG. 15 illustrates an example of a system configuration of a form management system according to a second embodiment.

FIG. 15 illustrates an example of a system configuration of a form management system 100A according to the second embodiment. The form management system 100A of the present embodiment includes a form management apparatus 300A and a billing destination terminal 500.

The form management apparatus 300A includes a customer management database 210, an invoice database 220, an embedment management database 230, a transaction management unit 240, an invoice management database 310, and a form management unit 320.

In the present embodiment, since the transaction management apparatus 200 and the form management apparatus 30X are implemented by one information processing apparatus, the load of communication in the form management system 100A can be reduced.

Hereinafter, a third embodiment will be described referring to the drawing. The third embodiment differs from the second embodiment in that a form management system 100 includes a billing source terminal 400. Thus, in the following description of the third embodiment, a reference sign similar to the reference sign used in the description of the second embodiment is applied to a component having a functional configuration similar to that of the second embodiment, and the description thereof is omitted.

Figure 16:
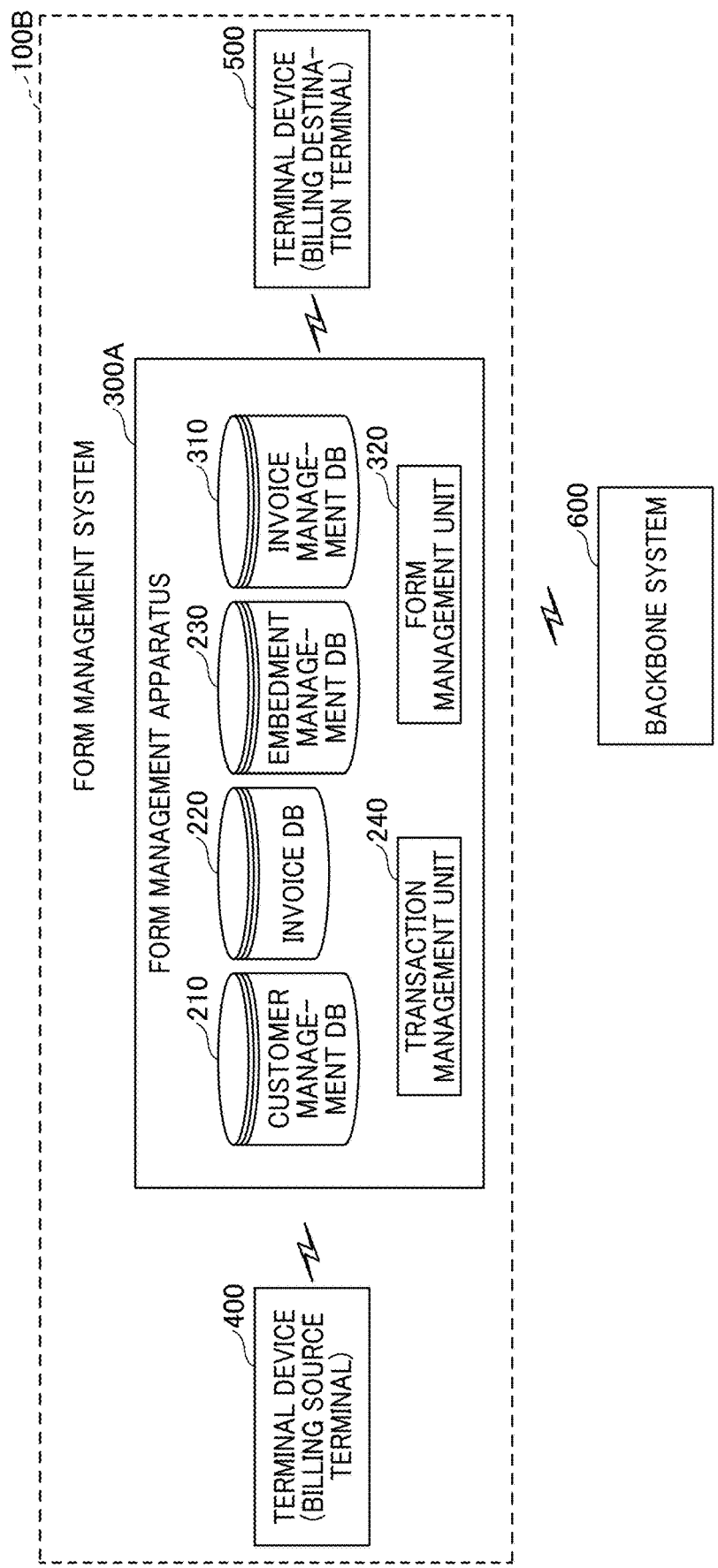
FIG. 16 illustrates an example of a system configuration of a form management system according to a third embodiment.

FIG. 16 illustrates an example of a system configuration of a form management system 100B according to the third embodiment. The form management system 100B of the present embodiment includes a form management apparatus 300A, a billing source terminal 400, and a billing destination terminal 500. In the form management system 100B, the billing source terminal 400 is a first terminal device included in the form management system 100B, and the billing destination terminal 500 is a second terminal device included in the form management system 100B.

In the present embodiment, the billing source terminal 400 is included in the form management system 100B, and an invoice image including an embedment code is created by the form management apparatus 300A based on invoice information input from the billing source terminal 400.

Accordingly, all invoices received by a recipient of invoices from the tenant A include embedment codes, and the form management apparatus 300A can acquire invoice information based on the embedment codes from the invoice database 220. Thus, in the present embodiment, the accuracy of information acquired from a form image can be increased.

The functions of the above-described embodiments may be implemented by one or more processing circuits or circuitry. Examples of the "processing circuit or circuitry" in the specification include a programmed processor, as a processor that is mounted on an electronic circuit and that performs the functions through software. Examples of the processing circuit or circuitry also include devices such as an application specific integrated circuit (ASIC), a digital signal processor (DSP), a field programmable gate array (FPGA), and conventional circuit components arranged to perform the recited functions.

The group of the apparatuses and devices described in the embodiments is merely one example of plural computing environments that implement one or more embodiments disclosed in the specification.

In one embodiment, a form management apparatus 300 includes a plurality of computing devices, such as a server cluster. The plurality of computing devices are configured to communicate with each other via any type of communication link, including a network, a shared memory, or the like and perform the processes disclosed in the specification. Likewise, the form management apparatus 300 may include a plurality of computing devices configured to communicate with each other.

Further, the form management apparatus 300 can be configured to share the disclosed processing steps in various combinations. For example, the process executed by the form management apparatus 300 may be executed by another server apparatus. Similarly, the functions of the form management apparatus 300 can be executed by another server apparatus. Respective elements of the server apparatus and the other server apparatus may be integrated into one server apparatus or may be divided into a plurality of apparatuses.

The correspondence tables in the specification may be generated through a learning effect of machine learning. Moreover, by classifying keywords and items that may be included in the description of the transaction content through machine learning, the correspondence tables need not be used.

In the present disclosure, machine learning is a technology that enables a computer to acquire human-like learning ability. Machine learning refers to a technology in which a computer autonomously generates an algorithm required for determination such as data identification from learning data loaded in advance, and applies the generated algorithm to new data to make a prediction. Any suitable learning method is applied for machine learning, for example, any one of supervised learning, unsupervised learning, semi-supervised learning, reinforcement learning, and deep learning, or a combination of two or more those learning. Any learning method may be employed for machine learning.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An information processing apparatus, comprising:
circuitry configured to
store, based on an issuance request from a first terminal, first tenant information and a first identifier of a form;
identify second tenant information based on a login request from a second terminal;
acquire an embedment code included in image data of the form;
determine whether a second identifier of the form is acquired from the embedment code of the image data of the form;
determine whether the first identifier matches the second identifier and whether the first tenant information matches the second tenant information;
in a case that the circuitry determines that the first identifier matches the second identifier and the first tenant information matches the second tenant information:
display, on a display, form management information obtained using the first identifier of the form, the form management information including content data of the form and management information for managing the form;
in a case that the circuitry determines that the first identifier does not match the second identifier or that the first tenant information does not match the second tenant information:
generate form information, indicating the content data of the form, by recognizing the image data of the form; and
display, on the display, the content data of the form information; and
in response to an instruction to output the form management information, output the form management information to an external device.

2. The information processing apparatus according to claim 1, further comprising:
a memory which stores, for each form, information for identifying an input source of form information and the form information input by the input source in association with each other.

3. The information processing apparatus according to claim 1, wherein the circuitry is further configured to
receive an input of form information,
generate the embedment code based on the input form information, and
embed the embedment code in the image data of the form, the embedment code including form identification information for identifying the form information.

4. The information processing apparatus according to claim 1, wherein the circuitry is further configured to display, on the display, a form image which includes the embedment code.

5. The information processing apparatus according to claim 1, wherein the circuitry is further configured to
perform form recognition on the image data of the form, and
display, on the display as form information, information acquired as a result of the form recognition.

6. The information processing apparatus according to claim 5, wherein the circuitry is further configured to display, on the display, the form information as the result of the form recognition in an appearance different than an appearance of information read from the embedment code.

7. The information processing apparatus according to claim 1, wherein the circuitry is further configured to display, on the display, the form information based on the embedment code in a state in which editing of the form information is prohibited.

8. An information processing system, comprising:
the information processing apparatus according to claim 1; and
a terminal device including the display.

9. An information processing method, comprising:
storing, based on an issuance request from a first terminal, first tenant information and a first identifier of a form;
identifying second tenant information based on a login request from a second terminal;
acquiring an embedment code included in image data of the form;

determining whether a second identifier of the form is acquired from the embedment code of the image data of the form;

determining whether the first identifier matches the second identifier and whether the first tenant information matches the second tenant information;

in a case that the first identifier matches the second identifier and the first tenant information matches the second tenant information:

displaying, on a display, form management information obtained using the first identifier of the form, the form management information including content data of the form and management information for managing the form;

in a case that the first identifier does not match the second identifier or that the first tenant information does not match the second tenant information:

generating form information, indicating the content data of the form, by recognizing the image data of the form; and displaying, on the display, the content data of the form information; and in response to an instruction to output the form management information, outputting the form management information to an external device.

\* \* \* \* \*